(12) United States Patent
Zhu

(10) Patent No.: US 9,398,523 B2
(45) Date of Patent: Jul. 19, 2016

(54) METHOD FOR DETERMINING NEIGHBORING BASE STATION, BASE STATION, AND PROCESSING NETWORK ELEMENT

(71) Applicant: Huawei Technologies Co., Ltd., Shenzhen, Guangdong (CN)

(72) Inventor: Wei Zhu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/577,987

(22) Filed: Dec. 19, 2014

(65) Prior Publication Data

US 2015/0105072 A1    Apr. 16, 2015

Related U.S. Application Data

(63) Continuation of application No. PCT/CN2013/070973, filed on Jan. 25, 2013.

(30) Foreign Application Priority Data

Jun. 20, 2012  (CN) .......................... 2012 1 0205423

(51) Int. Cl.
   *H04W 48/16* (2009.01)
   *H04W 64/00* (2009.01)
   *H04W 24/02* (2009.01)

(52) U.S. Cl.
   CPC .............. *H04W 48/16* (2013.01); *H04W 24/02* (2013.01); *H04W 64/003* (2013.01)

(58) Field of Classification Search
   CPC .................................................... H04W 48/16
   See application file for complete search history.

(56) References Cited

U.S. PATENT DOCUMENTS

| | | |
|---|---|---|
| 2008/0153507 A1 | 6/2008 | Taaghol et al. |
| 2009/0003279 A1 | 1/2009 | Abusch-Magder et al. |
| 2010/0197306 A1 | 8/2010 | Lopes |
| 2011/0317576 A1 | 12/2011 | Nguyen et al. |
| 2012/0213092 A1* | 8/2012 | Sun ...................... H04W 52/244 370/248 |
| 2012/0244878 A1* | 9/2012 | Cho ........................ G01S 5/02 455/456.1 |
| 2013/0223401 A1 | 8/2013 | Kitahara |
| 2013/0281107 A1 | 10/2013 | Uemura et al. |
| 2014/0011489 A1 | 1/2014 | Maida et al. |

FOREIGN PATENT DOCUMENTS

| | | |
|---|---|---|
| CN | 101064551 A | 10/2007 |
| CN | 101389125 A | 3/2009 |

(Continued)

*Primary Examiner* — Michael T Vu

(57) ABSTRACT

The present invention provides a method for determining a neighboring base station, a base station, and a processing network element. The method for determining a neighboring base station includes: receiving, by a base station, a measurement report, sent by a terminal, of another base station adjacent to the base station; sending, by the base station, the measurement report to a processing network element; and determining, by the processing network element, a neighboring base station of the base station according to the measurement report. The technical solution provided in the present invention can be used to determine a neighboring base station of a base station, which avoids a problem in the prior art that an error is likely to occur in manually determining a neighboring base station of a base station, thereby improving accuracy of determining a neighbor relationship between base stations.

3 Claims, 4 Drawing Sheets

(56) References Cited

FOREIGN PATENT DOCUMENTS

| | | | |
|---|---|---|---|
| CN | 101569230 A | 10/2009 |
| CN | 101594631 A | 12/2009 |
| CN | 101849370 A | 9/2010 |
| CN | 102273266 A | 12/2011 |
| CN | 102474827 A | 5/2012 |
| CN | 102883356 A | 1/2013 |
| EP | 1 657 950 A2 | 5/2006 |
| EP | 2 173 123 A1 | 4/2010 |
| EP | 2 205 023 A1 | 7/2010 |
| JP | H11150754 A | 6/1999 |
| JP | 2006-140829 A | 6/2006 |
| KR | 20110028003 A | 3/2011 |
| WO | WO 2008/093621 A1 | 8/2008 |
| WO | WO 2011/053534 A1 | 5/2011 |
| WO | WO 2012/063837 A1 | 5/2012 |

* cited by examiner

METHOD FOR DETERMINING NEIGHBORING BASE STATION, BASE STATION, AND PROCESSING NETWORK ELEMENT

CROSS-REFERENCE TO RELATED APPLICATIONS

This application is a continuation of International Application No. PCT/CN2013/070973, filed on Jan. 25, 2013, which claims priority to Chinese Patent Application No. 201210205423.8, filed on Jun. 20, 2012, both of which are hereby incorporated by reference in their entireties.

TECHNICAL FIELD

The present invention relates to wireless communications technologies, and in particular, to a method for determining a neighboring base station, a base station, and a processing network element.

BACKGROUND

With development of wireless data services and proliferation of mobile network solutions, the concept of a cell in a mobile network is gradually changing. In addition to a traditional macro cellular base station with wide coverage, there also appears a micro cellular base station (Micro base station), a pico cellular base station (Pico base station), and even a femto cellular base station (Femto base station), which cover a hot spot and an indoor area. The micro cellular base station, pico cellular base station, and femto cellular base station are collectively called a small cell base station. Due to limited coverage of the small cell base station, both installation density and the number of small cell base stations are much greater than those of macro cell base stations.

In the prior art, working staff generally determine a neighbor relationship between base stations by experience and according to a geographical location at which a base station is installed, so as to configure a scrambling code and a neighboring cell for each base station. Because both the installation density and the number of small cell base stations are relatively large, if the working personnel continue to leverage their experience and a geographical location of each base station to determine a neighbor relationship between base stations in a continuous coverage area, the determining process is labor-intensive and prone to errors, which greatly affects accuracy of subsequent scrambling code configuration and neighboring cell configuration for each base station.

SUMMARY

Multiple aspects of the present invention provide a method for determining a neighboring base station, a base station, and a processing network element, so as to improve accuracy of determining a neighboring base station.

According to a first aspect of the present invention, a method for determining a neighboring base station is provided, and the method includes:

receiving, by a base station, a measurement report, sent by a terminal, of another base station adjacent to the base station; and sending, by the base station, the measurement report of the other base station adjacent to the base station, so that a processing network element determines a neighboring base station of the base station according to the measurement report.

In the foregoing method for determining a neighboring base station, the measurement report includes a scrambling code and signal strength of the other base station adjacent to the base station.

According to a second aspect of the present invention, a method for determining a neighboring base station is provided, and the method includes:

receiving, by a processing network element, a measurement report sent by a base station, where the measurement report is a measurement report, sent by a terminal and received by the base station, of another base station adjacent to the base station; and determining, by the processing network element, a neighboring base station of the base station according to the measurement report.

In the foregoing method for determining a neighboring base station, the measurement report includes a scrambling code and signal strength of the other base station adjacent to the base station.

In the foregoing method for determining a neighboring base station, the determining, by the processing network element, a neighboring base station of the base station according to the measurement report is specifically:

when the signal strength of the other base station adjacent to the base station is greater than or equal to a preset signal strength threshold, determining, by the processing network element, that the other base station adjacent to the base station is the neighboring base station of the base station.

The foregoing method for determining a neighboring base station, after the determining, by the processing network element, a neighboring base station of the base station according to the measurement report, further includes:

configuring, by the processing network element, the determined neighboring base station of the base station as a neighboring cell of the base station.

The foregoing method for determining a neighboring base station, after the determining, by the processing network element, a neighboring base station of the base station according to the measurement report, further includes:

allocating, by the processing network element, scrambling codes to the base station and the neighboring base station of the base station according to the determined neighboring base station of the base station, where a scrambling code of each base station is different.

In the foregoing method for determining a neighboring base station, the allocating, by the processing network element, scrambling codes to the base station and the neighboring base station according to the determined neighboring base station of the base station, where a scrambling code of each base station is different, is specifically:

determining, by the processing network element according to the determined neighboring base station of the base station, that the neighboring base station of the base station is a base station whose scrambling code is mutually exclusive from that of the base station; and selecting, by the processing network element, a scrambling code from scrambling code resources, allocating the selected scrambling code to the base station, determining whether the scrambling code is the same as a scrambling code of the base station whose scrambling code is mutually exclusive from that of the base station, and if the two scrambling codes are the same, selecting, by the processing network element, another scrambling code from the scrambling code resources until the scrambling code allocated to the base station is different from the scrambling code of the base station whose scrambling code is mutually exclusive from that of the base station.

According to a third aspect of the present invention, a method for determining a neighboring base station is provided, and the method includes:

receiving, by a first base station, a signal transmitted by a second base station;

obtaining, by the first base station, a path loss of the signal according to the signal; and sending, by the first base station, the path loss of the signal, so that a processing network element determines a neighboring base station of the first base station according to the path loss of the signal.

In the foregoing method for determining a neighboring base station, the receiving, by a first base station, a signal transmitted by a second base station further includes:

increasing, by the second base station, a ratio of pilot channel power of the second base station to total transmit power.

According to a fourth aspect of the present invention, a method for determining a neighboring base station is provided, and the method includes:

receiving, by a processing network element, a path loss, sent by a first base station, of a signal, where the path loss of the signal is a path loss obtained by the first base station according to the signal that is transmitted by a second base station and received by the first base station; and determining, by the processing network element, a neighboring base station of the first base station according to the path loss of the signal.

In the foregoing method for determining a neighboring base station, the determining, by the processing network element, a neighboring base station of the first base station according to the path loss of the signal is specifically:

when the path loss of the signal is less than or equal to a preset path loss threshold, determining, by the processing network element, that the second base station which transmits the signal is the neighboring base station of the first base station.

The foregoing method for determining a neighboring base station, after the determining, by the processing network element, a neighboring base station of the first base station according to the path loss of the signal, further includes:

configuring, by the processing network element, the determined neighboring base station of the first base station as a neighboring cell of the first base station.

The foregoing method for determining a neighboring base station, after the determining, by the processing network element, a neighboring base station of the first base station according to the path loss of the signal, further includes:

allocating, by the processing network element, scrambling codes to the first base station and the neighboring base station of the first base station according to the determined neighboring base station of the first base station, where a scrambling code of each base station is different.

In the foregoing method for determining a neighboring base station, the allocating, by the processing network element, scrambling codes to the first base station and the neighboring base station of the first base station according to the determined neighboring base station of the first base station, where a scrambling code of each base station is different, is specifically:

determining, by the processing network element according to the determined neighboring base station of the first base station, that the neighboring base station of the first base station is a base station whose scrambling code is mutually exclusive from that of the first base station; and selecting, by the processing network element, a scrambling code from scrambling code resources, allocating the selected scrambling code to the first base station, determining whether the scrambling code is the same as a scrambling code of the base station whose scrambling code is mutually exclusive from that of the first base station, and if the two scrambling codes are the same, selecting, by the processing network element, another scrambling code from the scrambling code resources until the scrambling code allocated to the first base station is different from the scrambling code of the base station whose scrambling code is mutually exclusive from that of the first base station.

According to a fifth aspect of the present invention, a base station is provided, and the base station includes:

a first receiving unit, configured for the base station to receive a measurement report, sent by a terminal, of another base station adjacent to the base station; and a first sending unit, configured to send the measurement report of the other base station adjacent to the base station, so that a processing network element determines a neighboring base station of the base station according to the measurement report.

According to a sixth aspect of the present invention, a processing network element is provided, and the processing network element includes:

a first processing unit, configured to receive a measurement report sent by a base station, where the measurement report is a measurement report, sent by a terminal and received by the base station, of another base station adjacent to the base station; and a second processing unit, configured to determine a neighboring base station of the base station according to the measurement report.

In the foregoing processing network element, the second processing unit is specifically configured for the processing network element to: determine, when signal strength of the other base station adjacent to the base station is greater than or equal to a preset signal strength threshold, that the other base station adjacent to the base station is the neighboring base station of the base station.

The foregoing processing network element further includes: a third processing unit;

the third processing unit is adapted to configure the determined neighboring base station of the base station as a neighboring cell of the base station.

The processing network element mentioned above further includes: a fourth processing unit;

the fourth processing unit is configured to allocate scrambling codes to the base station and the neighboring base station of the base station according to the determined neighboring base station of the base station, where a scrambling code of each base station is different.

In the foregoing processing network element, the fourth processing unit includes:

a first module for determining a base station with a mutually exclusive scrambling code, configured to determine, according to the determined neighboring base station of the base station, that the neighboring base station of the base station is a base station whose scrambling code is mutually exclusive from that of the base station; and a first module for allocating a scrambling code, configured to select a scrambling code from scrambling code resources, allocate the selected scrambling code to the base station, determine whether the scrambling code is the same as a scrambling code of the base station whose scrambling code is mutually exclusive from that of the base station, and if the two scrambling codes are the same, select, by the processing network element, another scrambling code from the scrambling code resources until the scrambling code allocated to the base station is different from the scrambling code of the base station whose scrambling code is mutually exclusive from that of the base station.

According to a seventh aspect of the present invention, a base station is provided, and the base station includes:

a second receiving unit, configured to receive a signal transmitted by another base station;

an acquiring unit, configured to obtain a path loss of the signal according to the signal; and a second sending unit, configured to send the path loss of the signal, so that a processing network element determines a neighboring base station of the base station according to the path loss of the signal.

The foregoing base station further includes: a power adjusting unit;

the power adjusting unit is configured to increase a ratio of pilot channel power of the base station to total transmit power when the base station transmits a signal.

According to an eighth aspect of the present invention, a processing network element is provided, and the processing network element includes:

a fifth processing unit, configured to receive a path loss, sent by a first base station, of a signal, where the path loss of the signal is a path loss obtained by the first base station according to the signal that is transmitted by a second base station and received by the first base station; and a sixth processing unit, configured to determine a neighboring base station of the first base station according to the path loss of the signal.

In the foregoing processing network element, the sixth processing unit is specifically configured to:

when the path loss of the signal is less than or equal to a preset threshold, determine that the second base station which transmits the signal is the neighboring base station of the first base station.

The processing network element mentioned above further includes: a seventh processing unit;

the seventh processing unit is adapted to configure the determined neighboring base station of the first base station as a neighboring cell of the first base station.

The foregoing processing network element further includes: an eighth processing unit;

the eighth processing unit is configured to allocate scrambling codes to the first base station and the neighboring base station of the first base station according to the determined neighboring base station of the first base station, where a scrambling code of each base station is different.

In the foregoing processing network element, the eighth processing unit includes:

a second module for determining a base station with a mutually exclusive scrambling code, configured to determine, according to the determined neighboring base station of the first base station, that the neighboring base station of the first base station is a base station whose scrambling code is mutually exclusive from that of the first base station; and a second module for allocating a scrambling code, configured to select a scrambling code from scrambling code resources, allocate the selected scrambling code to the first base station, determine whether the scrambling code is the same as a scrambling code of the base station whose scrambling code is mutually exclusive from that of the first base station, and if the two scrambling codes are the same, select, by the processing network element, another scrambling code from the scrambling code resources until the scrambling code allocated to the first base station is different from the scrambling code of the base station whose scrambling code is mutually exclusive from that of the first base station.

It can be learned from the foregoing technical solutions that, in the present invention, a neighboring base station of a base station can be determined, which avoids a problem in the prior art that an error is likely to occur in manually determining a neighboring base station of a base station, thereby improving accuracy of determining a neighbor relationship between base stations.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

A base station described in embodiments of the present invention is a small cell base station, for example, a micro cell base station, a pico cell base station, and a femto cell base station; and each small cell base station covers a cell.

Figure 1:
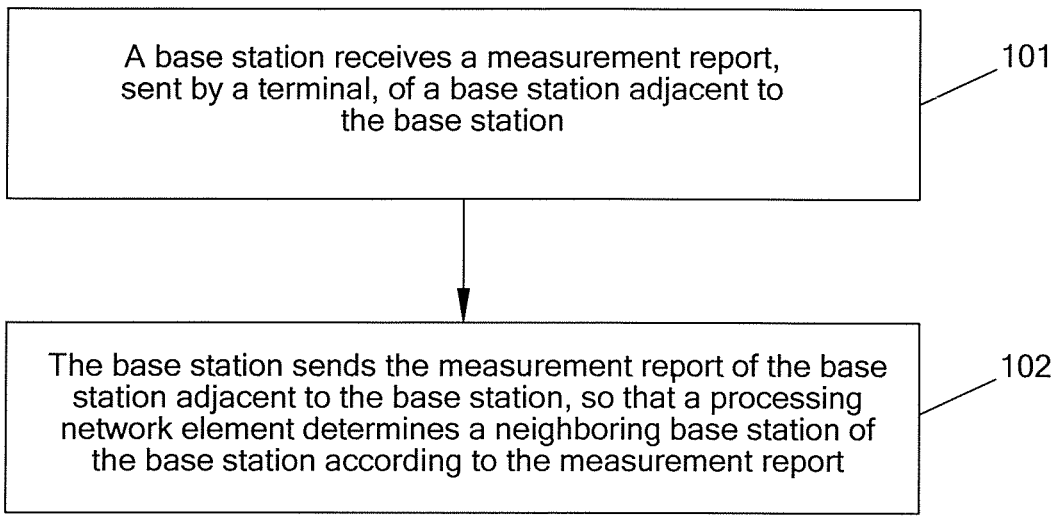
FIG. 1 is a schematic flowchart of Embodiment 1 of a method for determining a neighboring base station according to the present invention.

FIG. 1 shows a schematic flowchart of Embodiment 1 of a method for determining a neighboring base station according to the present invention. The method in this embodiment includes:

Step 101: A base station receives a measurement report, sent by a terminal, of another base station adjacent to the base station.

Specifically, in a process of a dialing test, the terminal measures, by using preset dialing test software, signal strength of said another base station adjacent to the base station, and sends a measurement result in a form of a measurement report to the base station. The measurement report includes a scrambling code and signal strength of said another base station adjacent to the base station.

Step 102: The base station sends the measurement report of said another base station adjacent to the base station, so that a processing network element determines a neighboring base station of the base station according to the measurement report.

The base station sends the measurement report of said another base station adjacent to the base station to the processing network element, and the processing network element determines a neighboring base station of the base station according to the measurement report. The processing network element may be a network element which is able to determine a neighboring base station of a base station, or is further able to configure a neighboring cell for a base station and allocate a scrambling code to the base station, for example, a radio network controller (Radio Network Controller, RNC), an access gateway (Access Gateway, AG), an operation and maintenance system (OM System).

In this embodiment of the present invention, a neighboring base station of a base station can be determined, which avoids a problem in the prior art that an error is likely to occur in manually determining a neighboring base station of a base station, thereby improving accuracy of determining a neighbor relationship between base stations and providing an accurate basis for subsequent scrambling code allocation and neighboring cell configuration.

Figure 2:
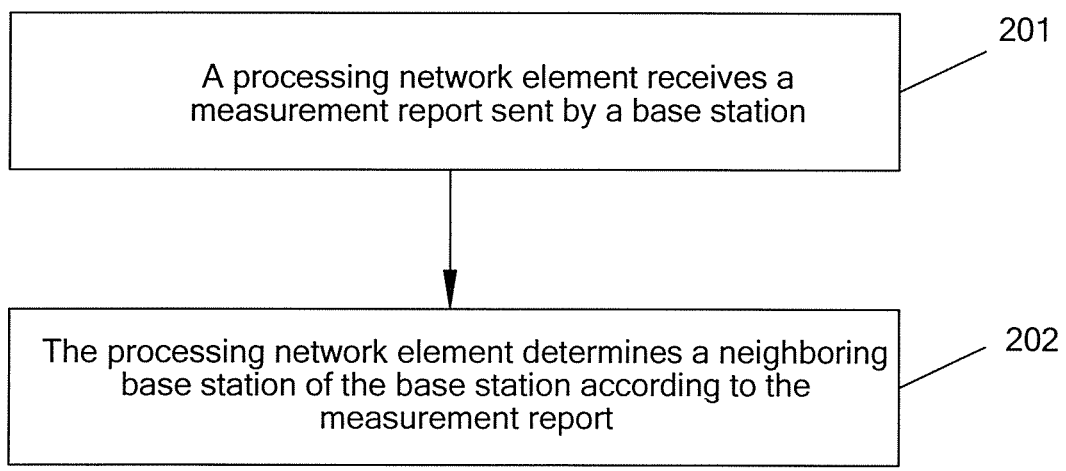
FIG. 2 is a schematic flowchart of Embodiment 2 of a method for determining a neighboring base station according to the present invention.

FIG. 2 shows a schematic flowchart of Embodiment 2 of a method for determining a neighboring base station according to the present invention. The method in Embodiment 2 includes:

Step 201: A processing network element receives a measurement report sent by a base station, where the measurement report is a measurement report, sent by a terminal and received by the base station, of another base station adjacent to the base station.

The terminal measures, by using dialing test software, signal strength of said another base station adjacent to the base station, and sends a measurement result in a form of a measurement report to the base station. The measurement report includes a scrambling code and signal strength of said another base station adjacent to the base station. The base station sends the received measurement report, which is sent by the terminal, to the processing network element.

Step 202: The processing network element determines a neighboring base station of the base station according to the measurement report.

Specifically, when the signal strength of said another base station adjacent to the base station is greater than or equal to a preset signal strength threshold, the processing network element determines that said another base station adjacent to the base station is a neighboring base station of the base station. In a process of a dialing test, the base station configures as many neighboring cells as possible, so as to avoid a call drop of the terminal in the process of dialing test. The processing network element determines a neighboring base station of the base station by determining signal strength, which may improve accuracy of determining a neighbor relationship between base stations, and effectively control the number of neighboring base stations of the base station.

In this embodiment of the present invention, a neighboring base station of a base station can be determined, which avoids a problem in the prior art that an error is likely to occur in manually determining a neighboring base station of a base station, thereby improving accuracy of determining a neighbor relationship between base stations and providing an accurate basis for subsequent scrambling code allocation and neighboring cell configuration.

After determining a neighboring base station of the base station, based on the determined neighbor relationship between base stations, the processing network element may configure neighboring cells for the base station and the neighboring base station of the base station and allocate scrambling codes to the base station and the neighboring base station of the base station. Therefore, after the foregoing step 202 in Embodiment 2, the method further includes: configuring, by the processing network element, the determined neighboring base station of the base station as a neighboring cell of the base station. Specifically, based on a result of determining a neighbor relationship between base stations, the processing network element configures the determined neighboring base station of the base station as a neighboring cell of the base station. After the foregoing step 202 in Embodiment 2, the method further includes: allocating, by the processing network element, scrambling codes to the base station and the neighboring base station of the base station according to the determined neighboring base station of the base station, where a scrambling code of each base station is different. Specifically, the processing network element may allocate the scrambling codes to the base stations according to 3GPP rules. The 3GPP rules include the following: 1. Scrambling codes of neighboring intra-frequency cells cannot be the same, that is, in this embodiment, a scrambling code of the base station and a scrambling code of a neighboring base station adjacent to the base station cannot be the same. 2. Scrambling codes of intra-frequency neighboring cells cannot be the same with each other, that is, in this embodiment, the scrambling code of the base station and a scrambling code of a neighboring base station of the neighboring base station adjacent to the base station cannot be the same.

The allocating, by the processing network element, scrambling codes to the base station and the neighboring base station of the base station according to the determined neighboring base station of the base station, where a scrambling code of each base station is different, includes:

Step 2031: According to the determined neighboring base station of the base station, the processing network element determines that the neighboring base station of the base station is a base station whose scrambling code is mutually exclusive from that of the base station.

Specifically, according to the foregoing 3GPP rules and according to the determined neighboring base station of the base station, the processing network element determines a base station with a mutually exclusive scrambling code for the base station. The processing network element determines that the neighboring base station of the base station is a base station whose scrambling code is mutually exclusive from that of the base station.

Step 2032: The processing network element selects a scrambling code from scrambling code resources, allocates the selected scrambling code to the base station, and determines whether the scrambling code is the same as a scrambling code of the base station whose scrambling code is mutually exclusive from that of the base station; and if the two scrambling codes are the same, the processing network element selects another scrambling code from the scrambling code resources until the scrambling code allocated to the base station is different from the scrambling code of the base station whose scrambling code is mutually exclusive from that of the base station.

To save scrambling code resources, the processing network element may allocate a scrambling code to each base station by sequentially selecting a scrambling code from the scrambling code resources, which effectively avoids a waste of the scrambling code resources which occurs because some of the scrambling code resources are omitted during random selection of the scrambling code resources.

The present invention provides Embodiment 3 of a method for determining a neighboring base station. With reference to an application instance shown in FIG. 3, Embodiment 3 further describes the method for determining a neighboring base station according to the present invention. The method in Embodiment 3 includes the following steps:

Step 301: A processing network element identifies each base station.

Specifically, the processing network element identifies which base stations, among base stations managed by the processing network element, need to be allocated a scrambling code or be configured with a neighboring cell, so as to distinguish the base stations from other base stations that have been allocated a scrambling code or have been configured with a neighboring cell. The processing network element may identify each base station by using physical identification information, stored in the processing network element, of each base station; or the processing network element acquires identification information of each base station from a base station to which a scrambling code is to be allocated or for which a neighboring cell is to be configured, so that the processing network element identifies each base station by using the acquired identification information. In the application instance shown in FIG. 3, base stations identified by the processing network element are respectively: a base station 1, a base station 2, a base station 3, a base station 4, and a base station 5.

Step 302: The processing network element configures a frequency for each identified base station, allocates a scrambling code to each identified base station by randomly selecting any scrambling code from scrambling code resources, and ensures that scrambling codes of any two of the identified base stations are different.

Each base station identified by the processing network element is set to work in a "network planning mode"; that is, after each base station is powered on, the processing network element configures a frequency for each base station, allocates an initial scrambling code to each base station, and ensures that initial scrambling codes of any two of the base stations are different. The purpose of configuring a frequency for each base station and allocating an initial scrambling code to each base station by the processing network element is to ensure that in a subsequent process of dialing test for a terminal, the terminal performs a dialing test by using the configured frequency and identifies each cell by using the allocated scrambling code. The "network planning mode" refers to a mode in which a base station works in a non-"normal mode", but the base station is able to transmit a signal to outside or search for and receive a signal transmitted by a base station in a neighboring cell, so as to perceive (or acquire) neighboring cell information, where the information may be specifically a scrambling code of the neighboring cell or identification information of the neighboring cell. The "normal mode" refers to a working mode in which a base station is able to implement two-way wireless communication in an existing established wireless communications network. When the base station works in the network planning mode, the scrambling code and the frequency that are allocated to each base station by the processing network element are all temporary, that is, the scrambling code and the frequency are randomly allocated for sole purpose of determining a neighbor relationship; therefore, it is only necessary to ensure that the frequency and the scrambling code of each base station do not interfere with each other, and other issues relating to scrambling codes and frequencies do not need to be taken into account.

Step 303: Perform a dialing test for a terminal in a continuous coverage area of the identified base stations, so that each base station receives a measurement report reported by the terminal.

Figure 3:
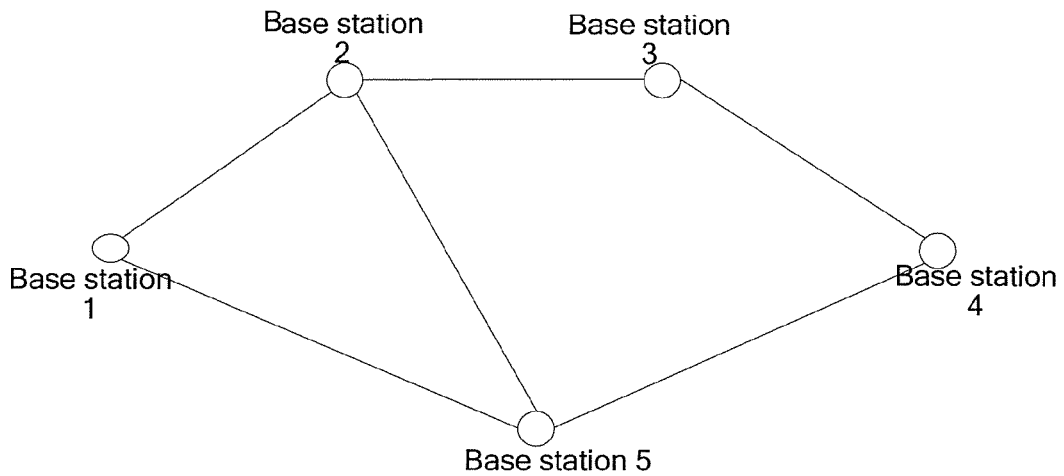
FIG. 3 is a schematic diagram of a specific application instance in which an embodiment of a method for determining a neighboring base station according to the present invention is practiced to determine a neighbor relationship between base stations.

Specifically, in the application instance shown in FIG. 3, the dialing test for the terminal is performed in a contiguous coverage area of the base station 1, the base station 2, the base station 3, the base station 4, and the base station 5. Working personnel use the terminal to make a call under one of the base stations, and then move within the continuous coverage area of the base station 1, the base station 2, the base station 3, the base station 4, and the base station 5, so as to perform a call test. For example, when the working personnel move to an edge of a cell covered by the base station 1, the terminal performs a handover between neighboring cells to maintain service continuity. For this reason, the base stations configure related neighboring cell measurement for the terminal, so that the terminal measures signal strength of a neighboring cell to prepare for a handover. At the edge of the cell covered by the base station 1, the terminal acquires a scrambling code of each surrounding neighboring cell and measures signal strength of each neighboring cell. The terminal reports the acquired scrambling code and the measured signal strength in a form of a measurement report to the base station 1. In a process of moving from the cell covered by the base station 1 to a cell covered by the base station 2, test software of the terminal reports in time signal strength of the base station 2 in the form of a measurement report to the base station 1, and at the same time, the base station 1 needs to configure the base station 2 in the measurement report as a neighboring cell, so as to avoid a call drop when a mobile phone moves from the cell covered by the base station 1 to the cell covered by the base station 2. By using the foregoing method, after the working personnel with the terminal move throughout the continuous coverage area of all base stations identified by the processing network element, each base station receives a measurement report that includes signal strength of at least one neighboring cell. It should be noted herein that in Embodiment 3, in the dialing test process, the terminal reports, in the uniform form of a measurement report, tested signal strength of all cells adjacent to a cell to which the base station belongs to the base station. Specifically, the measurement report includes at least one monitored set, and each monitored set corresponds to signal strength of one neighboring cell. If the measurement report includes two or more than two monitored sets, the terminal should also send a scrambling code of said another base station adjacent to the base station when sending, to the base station, signal strength of another base station adjacent to the base station, so as to distinguish the monitored sets in the measurement report, that is, signal strength of each base station. In addition, in the foregoing dialing test process, each base station configures as many neighboring cells as possible, so as to avoid a call drop. A neighboring cell configured by a base station in the dialing test process is a temporary neighboring cell. After a base station sends a received measurement report to the processing network element, the processing network element distinguishes signal strength of each base station by using the scrambling code of each base station in the measurement report, and then determines, according to the signal strength, whether a base station corresponding to a scrambling code corresponding to the signal strength is a neighboring base station of the base station.

Step 304: Each base station sends the measurement report to the processing network element.

Step 305: The processing network element determines neighbor relationships between the base stations according to the measurement reports sent by the base stations.

For example, in the application instance shown in FIG. 3, the processing network element receives measurement reports sent by the base station 1, the base station 2, the base station 3, the base station 4, and the base station 5, finds corresponding identification information according to the scrambling code of each base station in each measurement report, and obtains neighbor relationships between the base stations by statistics. Specifically, neighbor relationships between the base stations are shown in the following table 1 as a list of the neighbor relationships between the base stations, or are shown in FIG. 3 as a neighboring relationship diagram, where in FIG. 3, a straight line between two cells is used to indicate that a neighbor relationship exists between the two cells.

TABLE 1

Sample list of neighbor relationships between base stations

| Base Station Identification Information | Identification Information of a Neighboring Base Station | Signal Strength (dBm) |
|---|---|---|
| Base station 1 | Base station 2 | −90 |
| Base station 1 | Base station 5 | −85 |
| Base station 2 | Base station 1 | −89 |
| Base station 2 | Base station 3 | −79 |
| Base station 2 | Base station 5 | −86 |
| Base station 3 | Base station 2 | −81 |
| Base station 3 | Base station 4 | −85 |
| Base station 4 | Base station 5 | −81 |
| Base station 4 | Base station 3 | −87 |
| Base station 5 | Base station 1 | −86 |
| Base station 5 | Base station 2 | −88 |
| Base station 5 | Base station 4 | −80 |

In addition, in the foregoing process, a base station configures as many neighboring cells as possible, so as to avoid a call drop of the terminal in the dialing test process. If the number of neighboring cells of each base station needs to be controlled, the processing network element may determine a neighboring cell of a base station by determining signal strength of said another base station adjacent to the base station. Specifically, when the signal strength is greater than or equal to a preset signal strength threshold, the processing network element determines that a base station corresponding to a scrambling code corresponding to the signal strength is a neighboring base station of the base station.

After the foregoing step 301 to step 305, the processing network element may allocate a scrambling code to each base station and configure a neighboring cell for each base station according to the determined neighbor relationships between the base stations. Specifically, a process in which the processing network element allocates a scrambling code to each base station according to the determined neighbor relationships between the base stations may be implemented by using the following steps:

First, the processing network element determines for each base station, according to a neighbor relationship of each base station, abase station whose scrambling code is mutually exclusive from that of the base station.

Specifically, a theoretical basis for determining for each base station a base station whose scrambling code is mutually exclusive from that of the base station is that: a neighboring base station of each base station and a neighboring base station of each neighboring base station are all listed, and a duplicate base station is removed; then, the foregoing determining of a base station with a mutually exclusive scrambling code can be completed. A calculation result is shown in the following table 2.

TABLE 2

Sample list of base stations with mutually exclusive scrambling codes

| Base Station | Base Station with a Mutually Exclusive Scrambling Code |
|---|---|
| Base station 1 | Base station 2, base station 5, base station 3, and base station 4 |
| Base station 2 | Base station 1, base station 3, base station 5, and base station 4 |
| Base station 3 | Base station 2, base station 4, base station 1, and base station 5 |
| Base station 4 | Base station 5, base station 3, base station 1, and base station 2 |
| Base station 5 | Base station 1, base station 2, base station 4, and base station 3 |

Then, the processing network element allocates a scrambling code to each base station according to a base station which is determined for each base station and whose scrambling code is mutually exclusive from that of each base station.

Specifically, principles of allocating, by the processing network element, a scrambling code to each base station include the following: 1. A scrambling code to each base station is different from a scrambling code of a base station with a mutually exclusive scrambling code; 2. A scrambling code is sequentially selected from scrambling code resources. Theoretically, a process of allocating, by the processing network element, a scrambling code to each base station is implemented as follows:

First, the processing network element sequentially selects a scrambling code from the scrambling code resources and allocates the selected scrambling code to a base station; and then, it is determined whether a scrambling code of the base station is the same as a scrambling code of a base station which is already allocated a scrambling code and is among base stations whose scrambling code is mutually exclusive from that of the base station; if not the same, the scrambling code of the base station is the scrambling code allocated by the processing unit to the base station; if the two scrambling codes are the same, the processing unit selects a next scrambling code from the scrambling code resources until the scrambling code allocated to the base station is different from the scrambling code of the base station which is already allocated a scrambling code and is among the base stations whose scrambling code is mutually exclusive from that of the base station.

Specifically, the sample list of base stations with mutually exclusive scrambling codes in the foregoing table 2 is used as an example, and the processing unit allocates a scrambling code to each base station in sequence. Steps of allocating, by the processing unit, scrambling codes to the base stations are represented by using sequence numbers in the following table.

TABLE 3

Sample list of scrambling code allocation

| Sequence Number | Cell | Allocated Scrambling Code | Mutually Exclusive Scrambling Code |
|---|---|---|---|
| 1 | Base station 1 | SC1 | None |
| 2 | Base station 2 | SC2 | SC1 |
| 3 | Base station 3 | SC3 | SC2 and SC1 |
| 4 | Base station 4 | SC4 | SC3, SC1, and SC2 |
| 5 | Base station 5 | SC5 | SC1, SC2, SC4, and SC3 |

The mutually exclusive scrambling code in table 3 is a scrambling code that cannot be the same as a scrambling code allocated to a current cell. In the foregoing steps, if no scrambling code has been allocated to any of the base stations whose scrambling code is mutually exclusive from that of the base station, a scrambling code allocated by the processing unit to the cell has no mutually exclusive scrambling code. For example, in the foregoing table 3, a scrambling code SC1 of a cell 1 has no mutually exclusive scrambling code.

Figure 4:
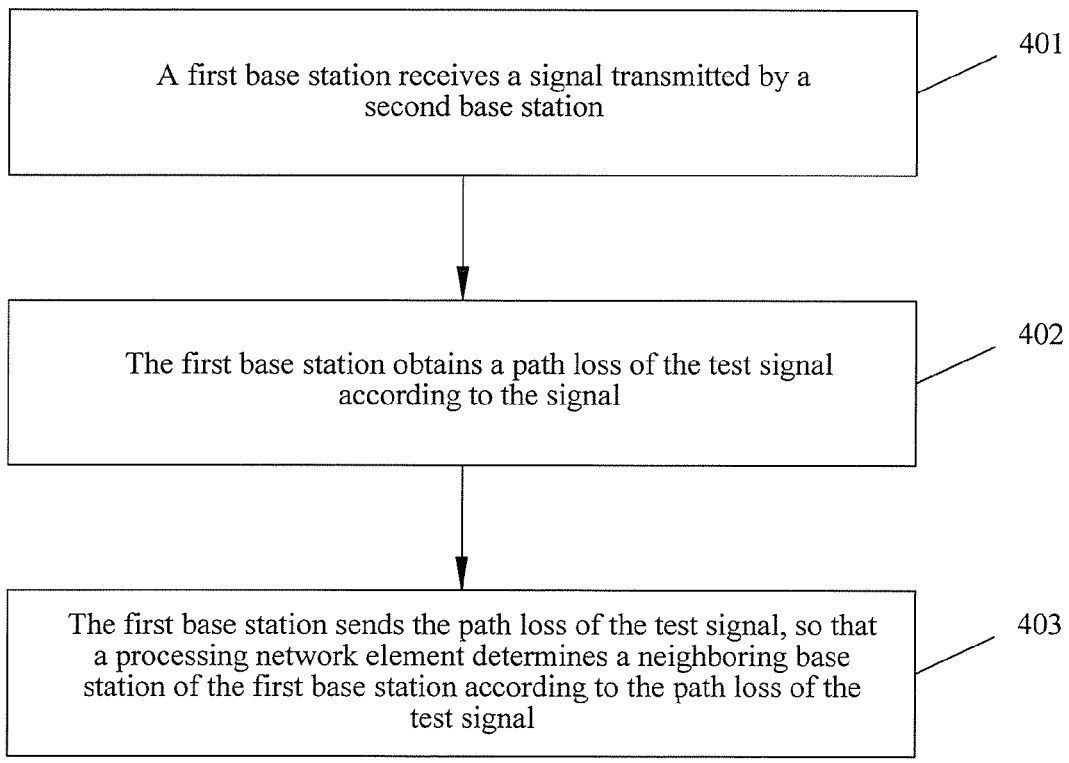
FIG. 4 is a schematic flowchart of Embodiment 3 of a method for determining a neighboring base station according to the present invention.

FIG. 4 shows a schematic flowchart of Embodiment 4 of a method for determining a neighboring base station according to the present invention. The method in Embodiment 4 includes:

Step 401: A first base station receives a signal transmitted by a second base station.

Generally, a ratio of pilot channel power to total transmit power is approximately 10% for a base station, so as to avoid mutual interference between two neighboring base stations. However, in this step, when one base station of the two neighboring base stations needs to receive a signal transmitted by the other base station, a ratio of pilot channel power to total transmit power needs to be increased for the base station which transmits the signal, for example, this ratio is increased to 50%-60%. After the ratio of pilot channel power to total transmit power is increased, a coverage radius of the signal transmitted by the base station is twice an original coverage radius, so that signal transmission between the two base stations can be implemented in this step.

Step 402: The first base station obtains a path loss of the signal according to the signal.

Specifically, after receiving the signal, the first base station performs a signal test on the signal to obtain the path loss that occurs in the signal when the signal is transmitted from the second base station to the first base station. In a practical application, after receiving the signal, the first base station performs a test on the received signal to obtain received signal strength; then according to transmitted signal strength acquired by the first base station from the second base station when the signal is transmitted, the first base station calculates a difference between the received signal strength and the transmitted signal strength, so as to obtain the path loss.

Step 403: The first base station sends the path loss of the signal, so that a processing network element determines a neighboring base station of the first base station according to the path loss of the signal.

Specifically, the first base station sends the path loss of the signal to the processing network element, and the processing network element determines a neighboring base station of the first base station according to the path loss of the signal. The processing network element may be a network element which is able to determine a neighboring base station of a base station, or is further able to configure a neighboring cell for a base station and allocate a scrambling code to the base station, for example, a radio network controller (Radio Network Controller, RNC), an access gateway (Access Gateway, AG), an operation and maintenance system (OM System).

In this embodiment, a neighboring base station of a base station can be determined by means of communication between neighboring base stations, which avoids a problem in the prior art that an error is likely to occur in manually determining a neighboring base station of a base station, thereby improving accuracy of determining a neighbor relationship between base stations.

Figure 5:
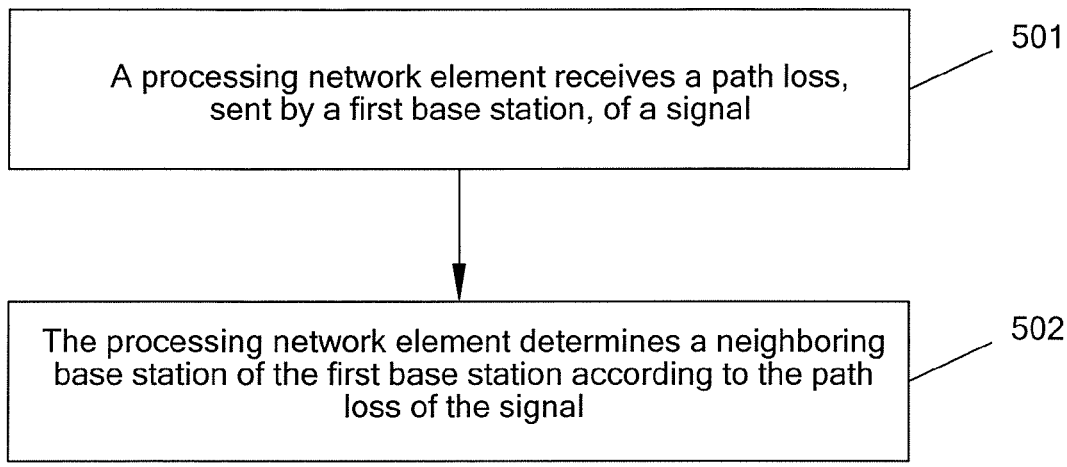
FIG. 5 is a schematic flowchart of Embodiment 4 of a method for determining a neighboring base station according to the present invention.

FIG. 5 shows a schematic flowchart of Embodiment 5 of a method for determining a neighboring base station according to the present invention. The method in Embodiment 5 includes:

Step 501: A processing network element receives a path loss, sent by a first base station, of a signal, where the path loss of the signal is a path loss obtained by the first base station according to the signal that is transmitted by a second base station and received by the first base station.

Specifically, the first base station receives the signal transmitted by the second base station and obtains, according to the signal, the path loss that occurs in the signal when the signal is transmitted from the second base station to the first base station. In a practical application, after receiving the signal, the first base station performs a signal test on the signal to obtain signal strength of the signal, and then compares the signal strength obtained by testing with preset signal strength to obtain the path loss of the signal. The preset signal strength is signal strength at which the second base station transmits the signal. The preset signal strength can be stored in the first base station beforehand. Finally, the first base station sends the obtained path loss of the signal to the processing network element.

Step 502: The processing network element determines a neighboring base station of the first base station according to the path loss of the signal.

Specifically, when the path loss of the signal is less than or equal to a preset path loss threshold, the processing network element determines that the second base station which transmits the signal is a neighboring base station of the first base station. The processing network element determines a neighboring cell of a base station by determining a path loss, which can improve accuracy of determining a neighbor relationship and effectively control the number of neighboring cells of each base station.

In this embodiment of the present invention, a neighboring base station of a base station can be determined, which avoids a problem in the prior art that an error is likely to occur in manually determining a neighboring base station of a base station, thereby improving accuracy of determining a neighbor relationship between base stations and providing an accurate basis for subsequent scrambling code allocation and neighboring cell configuration.

After the processing network element determines a neighbor relationship of a base station, based on the determined neighbor relationship, the processing network element may configure a neighboring cell for the base station and a neighboring base station of the base station, and allocate a scrambling code to the base station and the neighboring base station of the base station. Therefore, after the foregoing step 502 in Embodiment 5, the method further includes: configuring, by the processing network element, the determined neighboring base station of the first base station as a neighboring cell of the first base station. After the foregoing step 502 in Embodiment 5, the method further includes: allocating, by the processing network element, scrambling codes to the first base station and the neighboring base station of the first base station according to the determined neighboring base station of the first base station, where a cell scrambling code of each base station is different. Specifically, the processing network element may allocate a scrambling code to each cell according to 3GPP rules. Apparently, to save scrambling code resources, the processing network element may allocate a scrambling code to each cell by sequentially selecting a scrambling code from the scrambling code resources, which effectively avoids a waste of the scrambling code resources which occurs because some of the scrambling code resources are omitted during random selection of the scrambling code resources.

The allocating, by the processing network element, scrambling codes to the first base station and the neighboring base station of the first base station according to the determined neighboring base station of the first base station, where a scrambling code of each base station is different, includes:

Step 5031: According to the determined neighboring base station of the first base station, the processing network element determines that the neighboring base station of the first base station is a base station whose scrambling code is mutually exclusive from that of the first base station.

Step 5032: The processing network element selects a scrambling code from scrambling code resources, allocates the selected scrambling code to the first base station, and determines whether the scrambling code is the same as a scrambling code of the base station whose scrambling code is mutually exclusive from that of the first base station; and if the two scrambling codes are the same, the processing network element selects another scrambling code from the scrambling code resources until the scrambling code allocated to the first base station is different from the scrambling code of the base station whose scrambling code is mutually exclusive from that of the first base station.

The present invention provides Embodiment 6 of a method for determining a neighboring base station. The method in Embodiment 6 includes the following steps:

Step 601: A processing network element identifies each base station.

Specifically, the processing network element identifies which base stations among base stations managed by the processing network element need to be allocated a scrambling code or need to be configured with a neighboring cell, so as to distinguish the base stations from other base stations to which a scrambling code has been allocated or for which a neighboring cell has been configured. The processing network element may identify each base station by using physical identification information, stored in the processing network element, of each base station; or the processing network element acquires identification information of each base station from a base station to which a scrambling code is to be allocated or for which a neighboring cell is to be configured, so that the processing network element identifies each base station by using the acquired identification information.

Step 602: The processing network element assigns one base station among all identified base stations to transmit a signal to outside and assigns one or more other base stations to search for and receive the signal.

For example, in an application instance shown in FIG. 3, the processing network element sends a first instruction to a base station 1, so that the base station 1 establishes a cell according to a corresponding configuration parameter carried in the first instruction and transmits a signal to outside after the cell is established. The processing network element sends a second instruction to a base station 2, a base station 3, a base station 4, and a base station 5, so that the base station 2, the base station 3, the base station 4, and the base station 5 work in a receiving mode to search for and receive the signal transmitted by the base station 1. Actually, only a base station adjacent to the base station 1 can receive the signal sent by the base station 1. As shown in FIG. 3, after receiving the signal, the base station 2 and the base station 5 simultaneously measure signal strength at which the signal is received, and obtain identification information of the base station 1 from the signal. It should be noted herein that there is generally more than one base station adjacent to a base station. Therefore, in this embodiment, when a base station receives signals transmitted by neighboring base stations, the base stations that transmit the signals should further transmit identification information of the base stations, so as to distinguish signal strength of the received signals. Apparently, the identification information may be included in the signals. The base station 2 and the base station 5 store the obtained identification information and signal strength of the base station 1, so as to report the identification information and signal strength of the base station 1 to the processing network element. According to the foregoing process, the processing network element assigns the base station 2, the base station 3, the base station 4, and the base station 5 in sequence to transmit a signal to outside, and when the processing network element assigns one base station to transmit a signal to outside, all the other base stations are assigned to work in the receiving mode. After the base station 1, the base station 2, the base station 3, the base station 4, and the base station 5 each have established a cell and transmitted a signal to outside, the foregoing process ends. At this time, each base station has stored identification information and a path loss of another base station adjacent to the base station.

Step 603: Each base station sends stored identification information and path loss of a base station adjacent to each base station to the processing network element.

Step 604: The processing network element determines a neighbor relationship between the base stations according to the identification information and path loss of the base station adjacent to each base station, where the identification information and the pass loss are sent by each base station.

For example, in the application instance shown in FIG. 3, the processing network element receives, from the base station 1, base station 2, base station 3, base station 4, and base station 5, identification information and path losses of base stations adjacent to these base stations, and obtains neighbor relationships between these base stations by statistics according to the received information. Specifically, the neighbor relationships between these base stations are shown in the foregoing table 1 as a list of the neighbor relationships between the base stations, or are shown in FIG. 3 as a neighbor relationship diagram, where in FIG. 3, a straight line between two base stations is used to indicate that a neighbor relationship exists between the two base stations.

After the foregoing step 601 to step 604, the processing network element may allocate a scrambling code to each base station and configure a neighboring cell for each base station according to the determined neighbor relationships between the base stations. Specifically, a process in which the processing network element allocates a scrambling code to each base station according to the determined neighbor relationships between the base stations may be implemented by referring to the foregoing process, and details are not described herein again.

The foregoing embodiments only describe a method for determining, by each base station, a neighbor relationship at one frequency. The method in the embodiments of the present invention may be further applied to a scenario of multiple frequencies. Specifically, in the method in the embodiments of the present invention, a neighbor relationship is determined at each frequency separately, and then a neighboring cell determined by a base station at each different frequency can be obtained.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Figure 6:
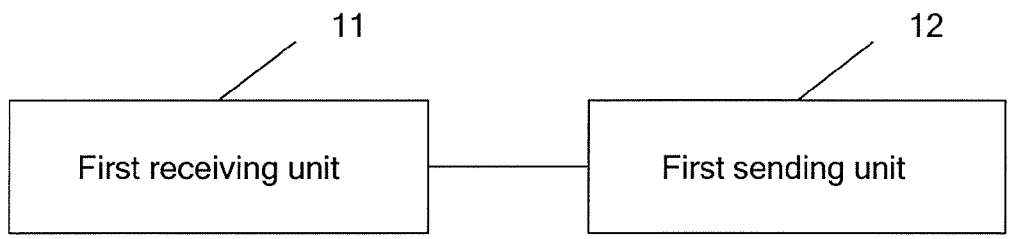
FIG. 6 is a schematic structural diagram of Embodiment 1 of a base station according to the present invention.

FIG. 6 is a schematic structural diagram of Embodiment 1 of a base station according to the present invention. As shown in FIG. 6, the base station includes: a first receiving unit 11 and a first sending unit 12. The first receiving unit 11 is configured for the base station to receive a measurement report, sent by a terminal, of another base station adjacent to the base station. The first sending unit 12 is configured to send the measurement report of said another base station adjacent to the base station, so that a processing network element determines a neighboring base station of the base station according to the measurement report.

In a process of dialing test, the terminal reports, in a form of a measurement report, signal strength, measured by the terminal, of another base station adjacent to the base station to the base station. Therefore, the first receiving unit in the foregoing embodiment is specifically configured to receive the measurement report sent by the terminal, where the measurement report includes the signal strength of said another base station adjacent to the base station.

A base station provided in Embodiment 1 may send signal strength, sent by a terminal, of another base station adjacent to the base station to a processing network element, so that a processing network element is able to accurately determine a neighboring base station of the base station according to the signal strength of said another base station adjacent to the base station.

Figure 7:
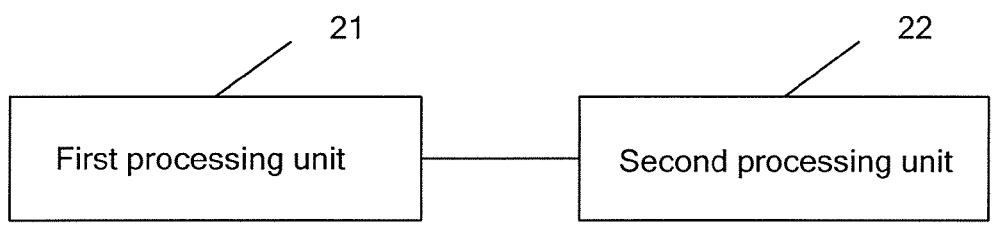
FIG. 7 is a schematic structural diagram of Embodiment 1 of a processing network element according to the present invention.

FIG. 7 is a schematic structural diagram of Embodiment 1 of a processing network element according to the present invention. As shown in FIG. 7, the processing network element includes: a first processing unit 21 and a second processing unit 22. The first processing unit 21 is configured to receive a measurement report sent by a base station, where the measurement report is a measurement report, sent by a terminal and received by the base station, of another base station adjacent to the base station. The second processing unit 22 is configured to determine a neighboring base station of the base station according to the measurement report.

The second processing unit is specifically configured for the processing network element to: determine, when signal strength of said another base station adjacent to the base station is greater than or equal to a preset signal strength threshold, that said another base station adjacent to the base station is a neighboring base station of the base station.

The processing network element in this embodiment may be an RNC, an AG, an OM system, or the like. According to received signal strength, sent by a base station, of another base station adjacent to the base station, the processing network element provided in Embodiment 1 determines a neighboring base station of the base station, which avoids a problem in the prior art that an error is likely to occur in manually determining a neighboring base station of a base station, thereby improving accuracy of determining a neighbor relationship between base stations.

Further, after the processing unit determines a neighboring base station of the base station, the processing network element can configure a neighboring cell for the base station according to a result of determining the neighbor relationship. Specifically, the processing network element further includes: a third processing unit. The third processing unit is adapted to configure the determined neighboring base station of the base station as a neighboring cell of the base station. Likewise, the processing network element may also allocate scrambling codes for the base station and the neighboring base station of the base station according to a result of determining the neighboring cell. Specifically, the processing network element further includes: a fourth processing unit. The fourth processing unit is configured to allocate scrambling codes to the base station and the neighboring base station of the first base station according to the determined neighboring base station of the base station, where a scrambling code of each base station is different. A process in which the fourth processing unit allocates a scrambling code for a cell is the same as the foregoing process in which the processing network element allocates a scrambling code to each cell according to the determined neighbor relationships between base stations.

The fourth processing unit includes a first module for determining a base station with a mutually exclusive scrambling code and a first module for allocating a scrambling code. The first module for determining a base station with a mutually exclusive scrambling code is configured to determine, according to the determined neighboring base station of the base station, that the neighboring base station of the base station is a base station whose scrambling code is mutually exclusive from that of the base station. The first module for allocating a scrambling code is configured to select a scrambling code from scrambling code resources, allocate the selected scrambling code to the base station, determine whether the scrambling code is the same as a scrambling code of the base station whose scrambling code is mutually exclusive from that of the base station, and if the two scrambling codes are the same, select, by the processing network element, another scrambling code from the scrambling code resources until the scrambling code allocated to the base station is different from the scrambling code of the base station whose scrambling code is mutually exclusive from that of the base station.

It can be learned from the foregoing, on the premise that a neighbor relationship of a base station is accurately determined, the processing network element may accurately configure a neighboring cell for a base station, allocate scrambling codes for the base station and a cell adjacent to the base station, and use a minimum of scrambling code resources.

Figure 8:
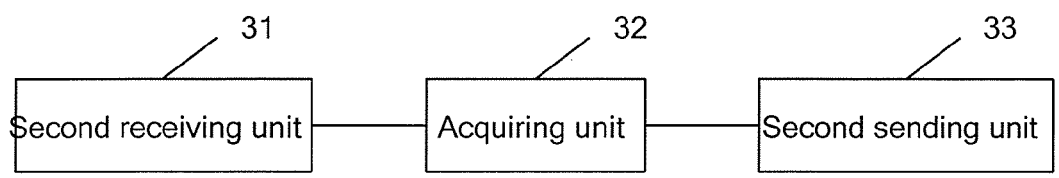
FIG. 8 is a schematic structural diagram of Embodiment 2 of a base station according to the present invention.

FIG. 8 is a schematic structural diagram of Embodiment 2 of a base station according to the present invention. As shown in FIG. 8, the base station in Embodiment 2 includes: a second receiving unit 31, an acquiring unit 32, and a second sending unit 33. The second receiving unit 31 is configured to receive a signal transmitted by another base station. The acquiring unit 32 is configured to obtain a path loss of the signal according to the signal. The second sending unit 33 is configured to send the path loss of the signal, so that a processing network element determines a neighboring base station of the base station according to the path loss of the signal.

Generally, a ratio of pilot channel power to total transmit power is approximately 10% for a base station, so as to avoid mutual interference between two neighboring base stations. However, in this embodiment, when one base station of the two neighboring base stations needs to receive a signal transmitted by the other base station, a ratio of pilot channel power to total transmit power needs to be increased for the base station which transmits the signal, for example, this ratio is increased to 50%-60%. Therefore, the base station in this embodiment further includes a power adjusting unit. The power adjusting unit is configured to increase the ratio of pilot channel power to total transmit power for the base station when the base station transmits the signal. When the base station works in a normal working mode, the power adjusting unit may decrease the increased ratio of pilot channel power to total transmit power to the ratio at which mutual interference between the two neighboring base stations is avoided.

A base station provided in this embodiment obtains, by means of direct communication between base stations, a path loss of a monitor signal transmitted by a neighboring base station, so that a processing network element accurately determines a neighboring base station of the first base station according to the path loss of the signal.

Figure 9:
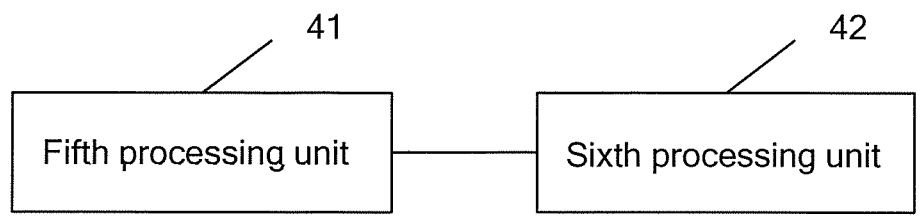
FIG. 9 is a schematic structural diagram of Embodiment 2 of a processing network element according to the present invention.

FIG. 9 is a schematic structural diagram of Embodiment 2 of a processing network element according to the present invention. As shown in FIG. 9, the processing network element in Embodiment 2 includes: a fifth processing unit 41 and a sixth processing unit 42. The fifth processing unit 41 is configured to receive a path loss, sent by a first base station, of a signal, where the path loss of the signal is a path loss obtained by the first base station according to the signal that is transmitted by a second base station and received by the first base station, and the second base station is a neighboring base station of the first base station. The sixth processing unit 42 is configured to determine a neighboring base station of the first base station according to the path loss of the signal.

The sixth processing unit is specifically configured for the processing network element to: determine, when the path loss of the signal is less than or equal to a preset threshold, that the second base station which transmits the signal is a neighboring base station of the first base station.

The processing network element in Embodiment 2 may be an RNC, an AG, an OM system, or the like. According to a received path loss, sent by a first base station, of a signal, the processing network element provided in Embodiment 2 determines a neighboring cell of a cell to which the base station belongs, which avoids a problem in the prior art that an error is likely to occur in manually determining a neighboring cell of the cell to which a base station belongs, thereby improving accuracy of determining a neighbor relationship between base stations.

Further, after the processing unit determines a neighboring cell of the base station, the processing network element can configure a neighboring cell for the base station according to a result of determining the neighboring cell. Specifically, the processing network element further includes: a seventh processing unit. The seventh processing unit is adapted to configure the determined neighboring base station of the first base station as a neighboring cell of the first base station. Likewise, the processing network element may also allocate scrambling codes for the base station and the neighboring cell of the base station according to a result of determining the neighboring cell. Specifically, the processing network element further includes: an eighth processing unit. The eighth processing unit is configured to allocate scrambling codes to the first base station and the neighboring base station of the first base station according to the determined neighboring base station of the first base station, where a scrambling code of each base station is different. A process in which the eighth processing unit allocates a scrambling code for a cell is the same as the foregoing process in which the processing network element allocates a scrambling code to each cell according to determined neighbor relationships between base stations.

The eighth processing unit includes a second module for determining a base station with a mutually exclusive scrambling code and a second module for allocating a scrambling code. The second module for determining a base station with a mutually exclusive scrambling code is configured to determine, according to the determined neighboring base station of the first base station, that the neighboring base station of the first base station is a base station whose scrambling code is mutually exclusive from that of the first base station. The second module for allocating a scrambling code is configured to select a scrambling code from scrambling code resources, allocate the selected scrambling code to the first base station, determine whether the scrambling code is the same as a scrambling code of the base station whose scrambling code is mutually exclusive from that of the first base station, and if the two scrambling codes are the same, select, by the processing network element, another scrambling code from the scrambling code resources until the scrambling code allocated to the first base station is different from the scrambling code of the base station whose scrambling code is mutually exclusive from that of the first base station.

It can be learned from the foregoing, on the premise that a neighbor relationship of a base station is accurately determined, the processing network element may accurately configure a neighboring cell for a base station, allocate scrambling codes for the base station and a cell adjacent to the base station, and use a minimum of scrambling code resources.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for determining a neighboring base station, the method comprising:

receiving, by a processing network element, a path loss, sent by a first base station, of a signal, wherein the path loss of the signal is a path loss obtained by the first base station according to the signal that is transmitted by a second base station and received by the first station; and determining, by the processing network element, a neighboring base station of the first base station according to the path loss of the signal; and wherein after determining, by the processing network element, a neighboring base station of the first base station according to the path loss of the signal, the method further comprises:

allocating, by the processing network element, scrambling codes to the first base station and the neighboring base station of the first base station according to the determined neighboring base station of the first base station, wherein a scrambling code of each base station is different;

wherein allocating, by the processing network element, scrambling codes to the first base station and the neighboring base station of the first base station according to the determined neighboring base station of the first base station, wherein a scrambling code of each base station is different, comprises:

determining, by the processing network element according to the determined neighboring base station of the first base station, that the neighboring base station of the first base station is a base station whose scrambling code is mutually exclusive from that of the first base station; and selecting, by the processing network element, a scrambling code from scrambling code resources, allocating the selected scrambling code to the first base station, determining whether the scrambling code is the same as a scrambling code of the base station whose scrambling code is mutually exclusive from that of the first base station, and if the two scrambling codes are the same, and selecting, by the processing network element, another scrambling code from the scrambling code resources until the scrambling code allocated to the first base station is different from the scrambling code of the base station whose scrambling code is mutually exclusive from that of the first base station.

2. The method for determining a neighboring base station according to claim 1, wherein determining, by the processing network element, a neighboring base station of the first base station according to the path loss of the signal comprises:

when the path loss of the signal is less than or equal to a preset path loss threshold, determining, by the processing network element, that the second base station which transmits the signal is the neighboring base station of the first base station.

3. The method for determining a neighboring base station according to claim 2, wherein after determining, by the processing network element, a neighboring base station of the first base station according to the path loss of the signal, the method further comprises:

configuring, by the processing network element, the determined neighboring base station of the first base station as a neighboring cell of the first base station.

* * * * *